(12) United States Patent
Delker et al.

(10) Patent No.: US 7,952,512 B1
(45) Date of Patent: May 31, 2011

(54) MOBILE DEVICE ENABLED RADAR TAGS

(75) Inventors: Jason R. Delker, Olathe, KS (US); John M. Everson, Leawood, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 283 days.

(21) Appl. No.: 12/251,201

(22) Filed: Oct. 14, 2008

(51) Int. Cl.
*G01S 13/42* (2006.01)

(52) U.S. Cl. ........... 342/42; 342/43; 342/44; 342/46; 342/56; 342/57; 342/58; 342/126; 342/146; 342/450; 342/463

(58) Field of Classification Search ........... 342/42–44, 342/46, 50–52, 56–58, 125–126, 133, 139, 342/146–147, 450–451, 454–458, 463
See application file for complete search history.

(56) References Cited

U.S. PATENT DOCUMENTS

| | | | | |
|---|---|---|---|---|
| 6,252,544 B1 * | 6/2001 | Hoffberg | | 342/357.31 |
| 6,429,812 B1 * | 8/2002 | Hoffberg | | 342/357.31 |
| 6,433,740 B1 * | 8/2002 | Gilhousen | | 342/442 |
| 6,791,472 B1 * | 9/2004 | Hoffberg | | 340/905 |
| 7,271,737 B1 * | 9/2007 | Hoffberg | | 340/905 |
| 7,286,835 B1 * | 10/2007 | Dietrich et al. | | 455/456.1 |
| 7,298,289 B1 * | 11/2007 | Hoffberg | | 340/903 |
| 7,835,856 B2 * | 11/2010 | Hay et al. | | 701/207 |
| 7,859,462 B2 * | 12/2010 | Small | | 342/450 |
| 2006/0103535 A1 * | 5/2006 | Pahlaven et al. | | 340/572.1 |
| 2007/0109111 A1 * | 5/2007 | Breed et al. | | 340/435 |
| 2007/0197261 A1 * | 8/2007 | Humbel | | 455/558 |
| 2008/0042815 A1 * | 2/2008 | Breed et al. | | 340/435 |
| 2008/0077255 A1 * | 3/2008 | Gila et al. | | 700/13 |
| 2008/0106457 A1 * | 5/2008 | Bartolini et al. | | 342/40 |

FOREIGN PATENT DOCUMENTS

WO    WO 03052455 A1 *   6/2003
WO    WO 2006011865 A1 *   2/2006

* cited by examiner

*Primary Examiner* — John B Sotomayor

(57) ABSTRACT

A method is provided for mobile device enabled radar tags. A signal is transmitted to a radar tag. The radar tag detects the signal. The radar tag provides information. The information is received from the radar tag. A location of the radar tag is determined based on the information. The radar tag is identified based on the information. The identification of the radar tag, the location of the radar tag, and a time associated with determining the location of the radar tag are recorded as data in a database. The radar tag is evaluated based on accessing a plurality of recordings of the data in the database.

20 Claims, 4 Drawing Sheets

MOBILE DEVICE ENABLED RADAR TAGS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radar tag creates synthetic radar returns that a radar receiver picks up in the same way that the radar receiver picks up radar echoes from other objects. In general, a radar transmitter transmits a pulse of energy and the radar receiver looks for the reflections of some of that energy back from objects. The radar tag detects the radar transmitter's transmitted pulse and returns a signal at substantially the same frequency as the radar transmitter's signal along with some additional information or data. As the radar receiver receives reflections from the environment, the radar receiver recognizes the radar tag's unique data signal and may place an icon on a user interface to indicate the identity and the location of the radar tag. In some circumstances, the United States military may use radar tags to identify personnel and equipment within radar range to avoid "friendly fire" injury to friendly forces and/or damage to friendly equipment.

SUMMARY

In some embodiments, a method is provided for mobile device enabled radar tags. A signal is transmitted to a radar tag. The radar tag detects the signal. The radar tag provides information. The information is received from the radar tag. A location of the radar tag is determined based on the information. The radar tag is identified based on the information. The identification of the radar tag, the location of the radar tag, and a time associated with determining the location of the radar tag are recorded as data in a database. The radar tag is evaluated based on accessing a plurality of recordings of the data in the database.

In other embodiments, a system is provided for mobile device enabled radar tags. The system includes a radar tag, a mobile device comprising the radar tag, a server, a user interface, a transmitter, and a receiver. The transmitter transmits a signal to the radar tag based on information associated with the mobile device. The radar tag detects the signal and responds with radar tag information. The receiver receives the response from the radar tag and conveys the response to the server. The server receives the response from the radar tag, determines a location of the radar tag based on the response, and provides data to the user interface to identify the radar tag based on the radar tag information and to specify the location of the radar tag.

In still other embodiments, a method is provided for mobile device enabled radar tags. A signal is transmitted to a plurality of radar tags. The signal is detected by the plurality of radar tags. The plurality of radar tags respond with information. A plurality of responses is received from the plurality of radar tags. A plurality of locations associated with the plurality of radar tags are determined based on the plurality of responses. The plurality of locations associated with the plurality of radar tags and a plurality of times associated with determining the plurality of locations associated with the plurality of radar tags are recorded as data in a database. Each of the plurality of radar tags are evaluated based on accessing a plurality of recordings of the data in the database. The evaluation of each of the plurality of radar tags is provided to at least one service subscriber.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
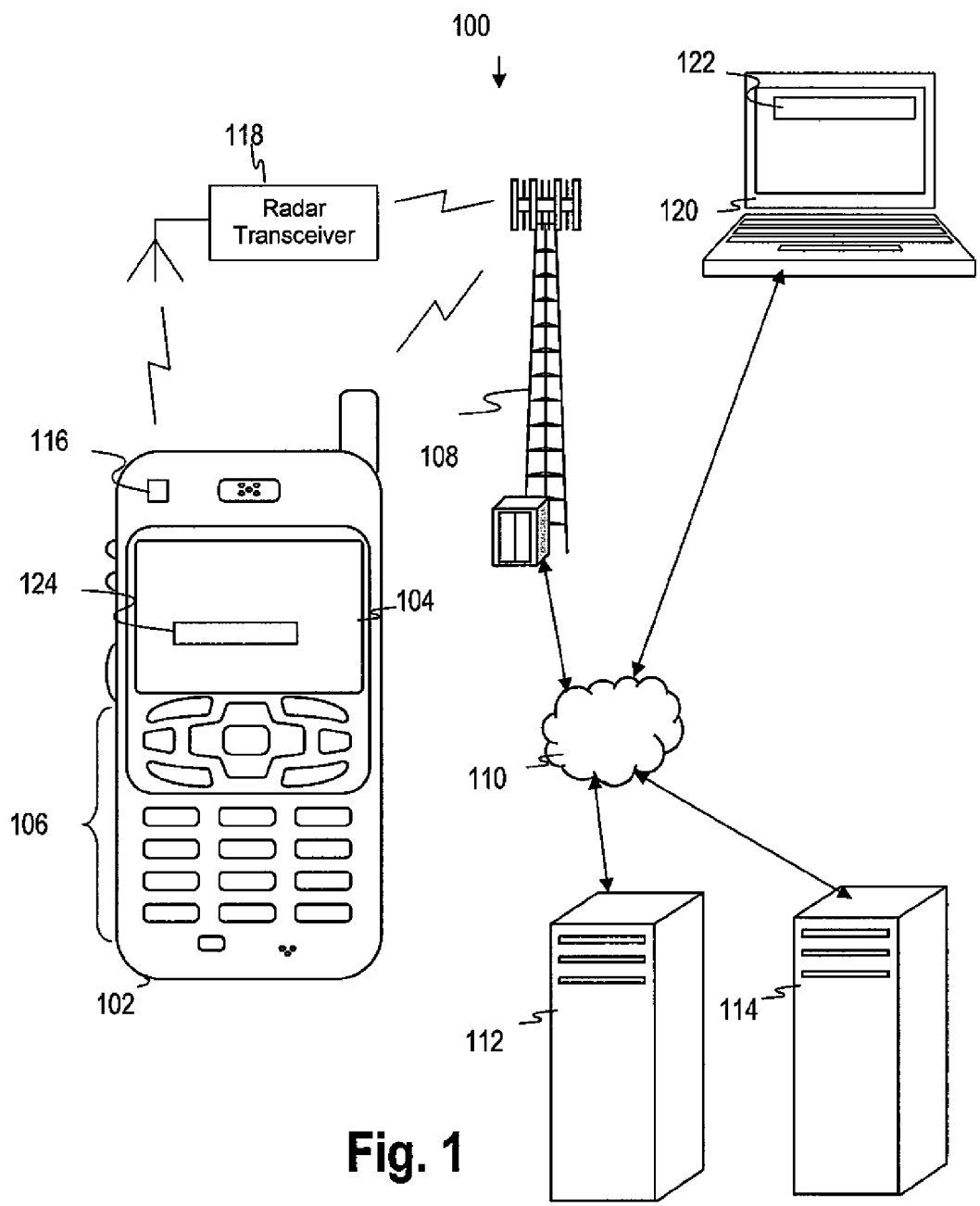
FIG. 1 shows an illustrative wireless communications system for mobile device enabled radar tags.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Emergency responders may not be able to precisely locate a mobile phone user who made an emergency 911 call if the call was made indoors because global positioning system location fixes require the mobile phone to be outdoors and because cell sector locations may only approximate the location of the mobile phone within 90 meters. The use of distributed antenna systems, femtocells and picocells may also create challenges in locating mobile phones. The emergency responders may travel to the cell tower sector where the 911 call originated or where the most recent calls from the mobile phone originated, and use a transmitter to transmit a signal to the radar tag in the mobile phone. When the radar tag responds with information that identifies the radar tag, the emergency responders may identify the precise location of the mobile phone to quickly provide any required emergency assistance to the mobile phone user, even if the mobile phone no longer has any power of its own.

An employer may use a transmitter to transmit a signal at a work site to workers' radar tags. The employer may use a receiver to receive information from the radar tags that may be used to identify each worker and each worker's location. The employer may use a database to record the identification of the radar tags, the location of the radar tags, and the time associated with determining the location of the radar tags. The employer may use the database to evaluate the radar tags, which may enable the employer to determine the time spent by each worker at each work-related location. This time may indicate which workers arrived late for work, left early from work, or took excessive breaks. The employer may also transmit signals to radar tags embedded in or attached to equipment to track the movement of expensive equipment, which may include activating a security camera when the radar tag in the equipment indicates that the equipment is being moved. If the employer does not want to frequently transmit signals during off-hours, the transmitter may be activated by a motion detector. If the employer is concerned about workers leaving their personal badges that include the radar tags at the locations where the worker is supposed to be working, the employer may transmit signals to the radar tags in the worker's mobile phones, which the workers are much less likely to leave behind. Furthermore, the employer may transmit signals to mobile phones that include radar tags to conduct an inventory of mobile phones that have been returned for exchange for a new mobile phone or repair without having to take the time and effort to open each mobile phone for identification purposes.

A traffic monitor may use multiple transmitters to transmit signals to radar tags that are in mobile phones that are in vehicles moving on a highway. Based on the responses picked up by multiple receivers from the radar tags, the traffic monitor may determine the locations of the radar tags and record the locations and the time that the locations were determined in a database. The traffic monitor may use the database to estimate the speeds of vehicles on the highway to determine traffic conditions, and forward the traffic conditions to the mobile phones of service subscribers who indicate an interest in the traffic conditions on the highway at specified times. The service subscribers may use alerts of congested traffic to select alternate routes that avoid the congestion.

FIG. 1 shows a wireless communications system 100 including a mobile device 102, which alternatively may be referred to as the handset 102. FIG. 1 depicts the handset 102, which is operable for implementing aspects of the present disclosure, but the present disclosure should not be limited to these implementations. Though illustrated as a mobile phone, the handset 102 may take various forms including a wireless handset, a pager, a personal digital assistant (PDA), a mobile telecommunication device, a mobile handset, a handheld gaming device, a handheld wireless mobile device, a media player, a digital camera, a digital music player, a digital calculator, a portable computer, an in-car computer and/or an in-car display screen, a tablet computer, a laptop computer, or equipment. Many suitable handsets combine some or all of these functions. In some embodiments of the present disclosure, the handset 102 is not a general purpose computing device like a portable, laptop or tablet computer, but rather is a special-purpose communications device such as a mobile phone, wireless handset, pager, or PDA. The handset 102 may support specialized activities such as gaming, inventory control, job control, and/or task management functions, and so on.

The handset 102 includes a display 104 and a touch-sensitive surface or keys 106 for input by a user. The handset 102 may present options for the user to select, controls for the user to actuate, and/or cursors or other indicators for the user to direct. The handset 102 may further accept data entry from the user, including numbers to dial or various parameter values for configuring the operation of the handset. The handset 102 may further execute one or more software or firmware applications in response to user commands. These applications may configure the handset 102 to perform various customized functions in response to user interaction. Additionally, the handset 102 may be programmed and/or configured over-the-air, for example from a wireless base station, a wireless access point, or a peer handset 102.

The handset 102 may execute a web browser application which enables the display 104 to show a web page. The web page may be obtained via wireless communications with a base transceiver station (BTS) 108, a wireless network access node, a femtocell, a peer handset 102 or any other wireless communication network or system. A femtocell, also known as an access point base station, may be a small cellular base station. The base transceiver station 108 (or wireless network access node) is coupled to a wired network 110, such as the Internet. Via the wireless link and the wired network, the handset 102 has access to information on various servers, such as a communication server 112 and a content server 114. The servers 112-114 may provide content that may be shown on the display 104. Alternately, the handset 102 may access the base transceiver station 108 through a peer handset 102 acting as an intermediary, in a relay type or hop type of connection. While one base transceiver station 108 is shown in FIG. 1, other base transceiver stations 108 could be present.

The system 100 may also include a radar tag 116, a radar transceiver 118, and a personal computer 120, which may display data 122 associated with the radar tag 116. The radar tag 116 may be a device that creates synthetic radar echoes in response to receiving a signal from a radar transmitter. In some embodiments, the radar tag 116 may also be a radio frequency identification (RFID) tag, a near field communication (NFC) tag, a Wi-Fi tag, a Worldwide Interoperability for Microwave Access (WiMAX) tag, a Bluetooth tag, or a similar communication tag. Although FIG. 1 depicts the radar transceiver 118 as combining the functions of transmitting signals and receiving responses to the transmitted signals, some embodiments may use both a radar transmitter and a radar receiver that are separate from each other. FIG. 1 depicts the radar transceiver 118 communicating with the servers 112-114 and the personal computer 120 via the base transceiver station 108, but the radar transceiver 118 may communicate with the servers 112-114 and the personal computer 120 via other wireless or wired means of communication. The display 104 may display an evaluation 124 of the location of other radar tags 116 if the user of the handset 102 is a subscriber to a radar tag service.

Figure 2:
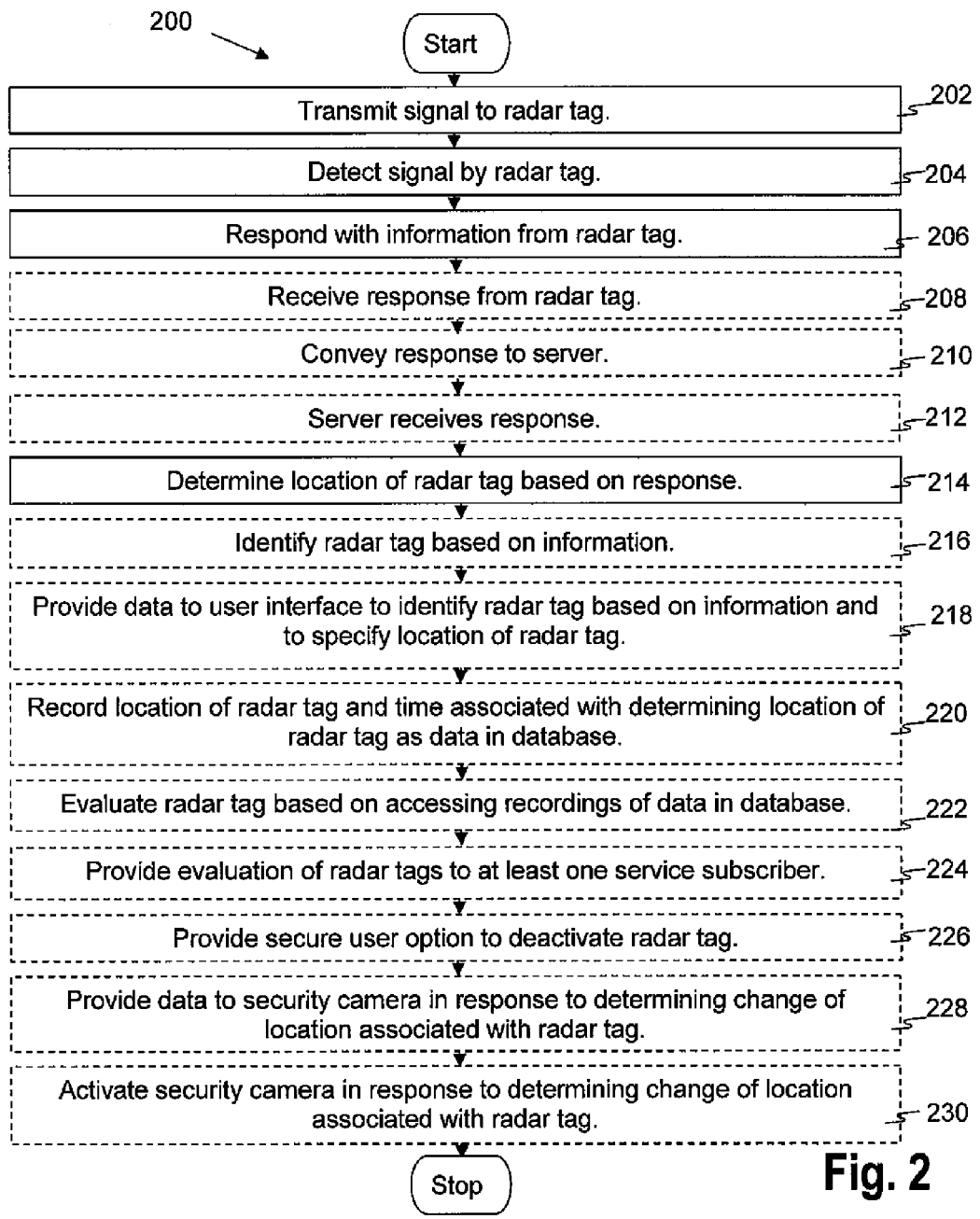
FIG. 2 is a flowchart of a method for mobile device enabled radar tags according to some embodiments of the present disclosure.

FIG. 2 is a flowchart illustrating a method 200 for mobile device enabled radar tags according to some embodiments of the present disclosure. The method can be used to determine locations of radar tags and evaluate the radar tags.

In box 202, a signal is transmitted to a radar tag. For example, the radar transceiver 118 transmits an encrypted signal to the radar tag 116 based on information associated with the mobile device 102. The information associated with the mobile device 102 may be a location associated with an emergency communication, the base transceiver station 108 associated with a recent communication by the mobile device 102, and/or a cell tower sector associated with a recent communication by the mobile device 102. For example, in response to a 911 call received from the mobile device 102, a police helicopter with the radar transceiver 118 travels to the base transceiver station 108 or the cell tower sector associated with the 911 call, or the most recent calls, made by the mobile device 102. The police helicopter uses the radar transceiver 118 to transmit an encrypted signal to the radar tag 116 when the police helicopter is at the base transceiver station 108 or the cell tower sector. The emergency communication may specify an identity associated with the radar tag 116. For example, the 911 call from the mobile device 102 may include the radar tag's 116 unique identifier to assist emergency responders in attempting to locate the radar tag 116, rather than other radar tags 116.

In another example, the radar transceiver 118 transmits a signal to multiple radar tags 116 that are associated with workers at a construction site. In yet another example, multiple radar transceivers 118 transmit a signal to multiple radar tags 116 that are associated with mobile devices 102 that are moving with vehicles on a highway.

In box 204, the radar tag detects the signal. For example, the radar tag 116, associated with the mobile device 102 that made the 911 call, detects the signal from the radar transceiver 118 in the police helicopter. In another example, multiple radar tags 116, associated with workers at the construction site, detect the signal from the radar transceiver 118. In yet another example, multiple radar tags 116, associated with mobile devices 102 that are moving with vehicles on the highway, detect the signal from the multiple radar transceivers 118.

In box 206, the radar tag responds with information. For example, the radar tag 116 responds with information to the radar transceiver 118 in the police helicopter. In another example, multiple radar tags 116, associated with workers at the construction site, respond with information to the radar transceiver 118 at the construction site. In yet another example, multiple radar tags 116, associated with mobile devices 102 that are moving with vehicles on the highway, respond with information to the multiple radar transceivers 118 near the highway.

While the radar tag 116 may use the signal to provide the energy for the response, the radar tag 116 may also use the mobile device 102 to amplify the response. The signal may prompt the response from a specified radar tag 116 or from a plurality of unspecified radar tags 116. For example, the radar transceiver 118 in the police helicopter may transmit an encrypted signal that prompts a response from only the radar tag 116 associated with the mobile device 102 that made the 911 call. In another example, the radar transceiver 118 at the construction site may transmit an encrypted signal that prompts a response from all radar tags 116 associated with workers at the construction site to the radar transceiver 118. In yet another example, the multiple radar transceivers 118 near the highway may transmit an encrypted signal that prompts a response from all radar tags 116 associated with mobile devices 102 that are moving with vehicles on the highway to the communication server 112.

In box 208, the response is optionally received from the radar tag. For example, the radar transceiver 118 in the police helicopter receives an encrypted response from the radar tag 116 associated with the mobile device 102 that made the 911 call. In another example, the radar transceiver 118 at the construction site receives the responses from multiple radar tags 116 associated with workers at the construction site. In yet another example, the multiple radar transceivers 118 near the highway receive the responses from multiple radar tags 116 associated with mobile devices 102 that are moving with vehicles on the highway.

In box 210, the response is optionally conveyed to a server. For example, the radar transceiver 118 in the police helicopter conveys the response to the communication server 112. In another example, the radar transceiver 118 at the construction site conveys the responses to the communication server 112. In yet another example, the multiple radar transceivers 118 near the highway convey the responses to the communication server 112.

In box 212, the server receives the response from the radar tag. For example, the communication server 112 receives the response from the radar tag 116 via the radar transceiver 118 in the police helicopter. In another example, the communication server 112 receives the responses from the radar tags 116 via the radar transceiver 118 at the construction site. In yet another example, the communication server 112 receives the responses from the radar tags 116 via the multiple radar transceivers 118 near the highway. In some embodiments, the communication server 112 receives the responses directly from the radar tags 116 associated with mobile devices 102 that are moving with vehicles on the highway.

In box 214, a location of the radar tag is determined based on the response. For example, the communication server 112 determines a location of the radar tag 116, associated with the mobile device that made the 911 call, based on the response. In another example, the communication server 112 determines the locations of the radar tags 116, associated with workers at the construction site, based on the responses. In yet another example, the communication server 112 determines the locations of the radar tags 116, associated with mobile devices 102 that are moving with vehicles on the highway, based on the responses. Therefore, the location of the radar tags 116 may be determined based on the radar transceiver 118 transmitting a specific signal that generates responses only from specific radar tags 116 or the radar transceiver 118 transmitting a general signal that generates responses from each of the radar tags 116 that detect the general signal. However, the location of the radar tags 116 may also be determined based on only some of the responses from the radar tags 116 that detect the general signal.

In box 216, the radar tag is optionally identified based on the information. For example, the communication server 112 identifies the radar tag 116 associated with the mobile device 102 that made the 911 call. In another example, the communication server 112 identifies the radar tags 116 associated with workers at the construction site. In yet another example, the communication server 112 identifies the radar tags 116 associated with mobile devices 102 that are moving with vehicles on the highway.

In box 218, data is optionally provided to a user interface to identify the radar tag based on the information and to specify the location of the radar tag. For example, the communication server 112 provides encrypted data to the personal computer 120 to identify and specify the location of the radar tag 116 associated with the mobile device 102 that made the 911 call.

In box 220, the location of the radar tag and a time associated with determining the location of the radar tag are optionally recorded as data in a database. For example, the content server 114 records the identification of the radar tags 116 associated with workers at the construction site, the location of the radar tags 116 at the construction site, and the times associated with the locations of the radar tags 116. In another example, the content server 114 records the locations of the radar tags 116 associated with mobile devices 102 that are moving with vehicles on the highway and the times associated with the locations.

In box 222, the radar tag is optionally evaluated based on accessing a plurality of recordings of the data in the database. For example, the content server 114 evaluates the radar tags 116 associated with workers at the construction site to determine the time spent throughout the workday by the workers at each work-related location. In another example, the content server 114 evaluates the radar tags 116 associated with mobile devices 102 that are moving with vehicles on the highway to determine a traffic alert for a congested traffic condition, based on an indication that the vehicles associated with the radar tags 116 are moving on the highway at an estimated speed of only 5 miles per hour.

The content server 114 may also determine an inventory of mobile devices 102 associated with radar tags 116. For example, the content server 114 uses the radar tags 116 in the mobile devices 102 to identify the mobile devices 102 that have been returned for repair, for a refund, or as an exchange for new mobile devices 102.

Additionally, the content server 114 may determine an inventory of other types of items associated with radar tags 116. For example, the radar transceiver 118 transmits a general signal to a warehouse that generates responses from each of the radar tags 116 associated with items in the warehouse. The content server 114 compares the responses to previously received responses to identify how many of each item associated with the radar tags 116 is no longer in the warehouse, how many of each item associated with the radar tags 116 is in the warehouse, and where each of these items in the warehouse is located.

In box 224, the evaluation of the radar tags is optionally provided to at least one service subscriber. For example, the content server 114 provides the evaluation 124, which includes the traffic alert that vehicles are moving on the highway at an estimated speed of 5 miles per hour, to the mobile device 102 of a service subscriber that has specified interest in traffic conditions on the highway during rush hour traffic. In another example, the content server 114 provides the data 122, which includes the traffic alert that vehicles are moving on the highway at an estimated speed of 85 miles per hour, to the personal computer 120 of a traffic enforcement agency that has specified interest in traffic conditions on the highway during rush hour traffic.

In box 226, the mobile device optionally provides a secure user option to deactivate the radar tag. For example, the mobile device 102 provides a secure user option to deactivate the radar tag 116 when the user of the mobile device 102 is concerned about privacy and does not want the location of the mobile device 102 to be determined. The radar tag 116 may be deactivated on a timed basis, such that the radar tag 116 reactivates after a specified period of time, or on a status basis, such that the radar tag 116 is not reactivated until the user of the mobile device 102 explicitly reactivates the radar tag 116. In some embodiments, the deactivation may be overridden by appropriate authorities using a particular encrypted signal or some other means.

In box 228, the data is optionally provided to a security camera in response to determining a change of location associated with the radar tag. For example, after determining a change of location for the equipment that includes the radar tag 116, the communication server 112 provides time and location data to a security camera. In response, the security camera may track the equipment as the location of the equipment changes. The security camera may also add the time and location data to the camera's recording, which enables security personnel that subsequently review the recording to fast forward through the recording to arrive at the time of the recording associated with the change of the equipment's location.

In box 230, a security camera is optionally activated in response to determining a change of location associated with the radar tag. For example, after determining a change of location for the equipment that includes the radar tag 116, the communication server 112 activates a security camera to record the equipment's change of location. By waiting for equipment to change location, the security camera may maintain a longer battery life and make fewer recordings of non-moving equipment.

Figure 3:
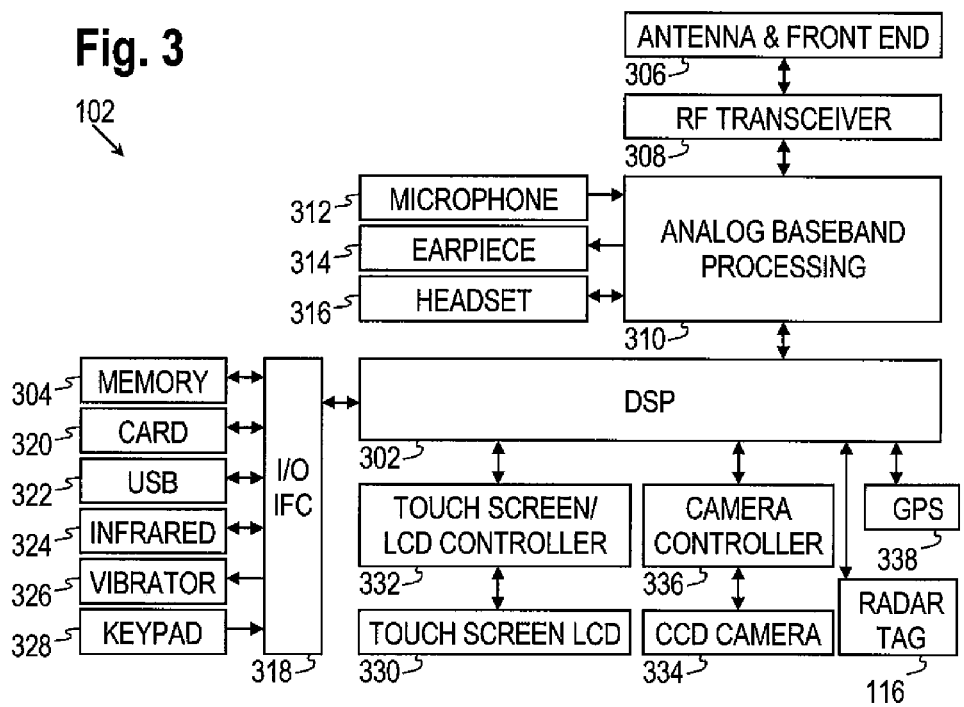
FIG. 3 shows a block diagram of an illustrative device.

FIG. 3 shows a block diagram of the handset 102. While a variety of known components of handsets 102 are depicted, in an embodiment a subset of the listed components and/or additional components not listed may be included in the handset 102. The handset 102 includes a digital signal processor (DSP) 302 and a memory 304. As shown, the handset 102 may further include an antenna and front end unit 306, a radio frequency (RF) transceiver 308, an analog baseband processing unit 310, a microphone 312, an earpiece speaker 314, a headset port 316, an input/output interface 318, a removable memory card 320, a universal serial bus (USB) port 322, an infrared port 324, a vibrator 326, a keypad 328, a touch screen liquid crystal display (LCD) with a touch sensitive surface 330, a touch screen/LCD controller 332, a charge-coupled device (CCD) camera 334, a camera controller 336, a global positioning system (GPS) sensor 338, and the radar tag 116. In an embodiment, the handset 102 may include another kind of display that does not provide a touch sensitive screen. In an embodiment, the DSP 302 may communicate directly with the memory 304 without passing through the input/output interface 318.

The DSP 302 or some other form of controller or central processing unit operates to control the various components of the handset 102 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the handset 102 to send and receive information from a radio access network (RAN) or some other available wireless communications network or from a peer handset 102. In an embodiment, the antenna and front end unit 306 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 306 may include antenna tuning and/or impedance matching components, RF power amplifiers, and/or low noise amplifiers.

The RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 and/or the DSP 302 or other central processing unit. In some embodiments, the RF transceiver 308, portions of the antenna and front end 306, and the analog baseband processing unit 310 may be combined in one or more processing units and/or application specific integrated circuits (ASICs).

The analog baseband processing unit 310 may provide various analog processing of inputs and outputs, for example analog processing of inputs from the microphone 312 and the headset port 316 and outputs to the earpiece speaker 314 and the headset port 316. To that end, the analog baseband processing unit 310 may have ports for connecting to the built-in microphone 312 and the earpiece speaker 314 that enable the handset 102 to be used as a mobile phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In some embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation. In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the handset 102 to function as a peripheral device to exchange information with a personal computer or other computer system. The infrared port 324 and other optional ports such as a Bluetooth interface or an IEEE 802.11 compliant wireless interface may enable the handset 102 to communicate wirelessly with other nearby handsets and/or wireless base stations.

The input/output interface 318 may further connect the DSP 302 to the vibrator 326 that, when triggered, causes the handset 102 to vibrate. The vibrator 326 may serve as a mechanism for silently alerting the user to any of various events such as an incoming call, a new text message, and an appointment reminder.

The keypad 328 couples to the DSP 302 via the interface 318 to provide one mechanism for the user to make selections, enter information, and otherwise provide input to the handset 102. Another input mechanism may be the touch screen LCD 330, which may also display text and/or graphics to the user. The touch screen LCD controller 332 couples the DSP 302 to the touch screen LCD 330.

The CCD camera 334 enables the handset 102 to take digital pictures. The DSP 302 communicates with the CCD camera 334 via the camera controller 336. The GPS sensor 338 is coupled to the DSP 302 to decode global positioning system signals, thereby enabling the handset 102 to determine its position. In another embodiment, a camera operating according to a technology other than charge coupled device cameras may be employed. Various other peripherals may also be included to provide additional functions, e.g., radio and television reception.

Figure 4:
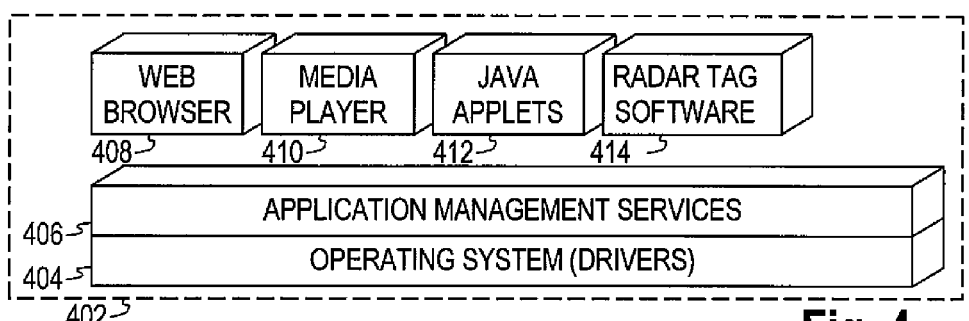
FIG. 4 shows a block diagram of an illustrative software configuration for a mobile device.

FIG. 4 illustrates a software environment 402 that may be implemented by the DSP 302. The DSP 302 executes operating system drivers 404 that provide a platform from which the rest of the software operates. The operating system drivers 404 provide drivers for the handset hardware with standardized interfaces that are accessible to application software. The operating system drivers 404 include application management services ("AMS") 406 that transfer control between applications running on the handset 102. Also shown in FIG. 4 are a web browser application 408, a media player application 410, JAVA applets 412, and radar tag software 414. The web browser application 408 configures the handset 102 to operate as a web browser, allowing a user to enter information into forms and select links to retrieve and view web pages. The media player application 410 configures the handset 102 to retrieve and play audio or audiovisual media. The JAVA applets 412 configure the handset 102 to provide games, utilities, and other functionality. The radar tag software 414 may convey the information from the radar tag 116 to the content server 114 via the BTS 108, the network 110, and the communication server 112, as an alternative to the radar tag 116 responding directly to the radar transceiver 118.

Figure 5:
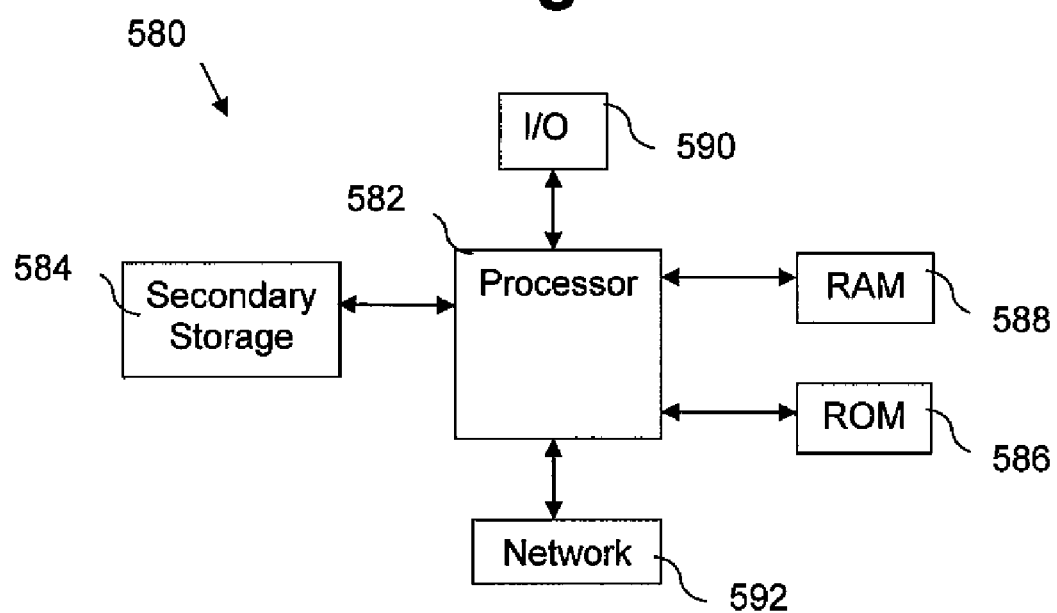
FIG. 5 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for radar tags, comprising:
    transmitting a signal to a radar tag that creates a synthetic radar echo in response to receiving the signal, wherein the synthetic radar echo comprises information provided by the radar tag;
    receiving the synthetic radar echo from the radar tag;
    determining by a server computer a location of the radar tag based on the synthetic radar echo;
    identifying by a server computer the radar tag based on the synthetic radar echo;
    recording by a server computer the identification of the radar tag, the location of the radar tag, and a time associated with determining the location of the radar tag as data in a database; and
    evaluating by a server computer the radar tag based on accessing a plurality of recordings of the data in the database.

2. The method of claim 1, wherein the radar tag is associated with a mobile device that is at least one of a group of mobile devices consisting of equipment, a mobile phone, a wireless handset, a portable computer, a tablet computer, a laptop computer, a mobile telecommunication device, a mobile handset, a personal digital assistant, a handheld gaming device, a handheld wireless mobile device, a pager, a digital camera, a digital music player, and a digital calculator.

3. The method of claim 1, wherein evaluating the radar tag based on accessing the plurality of recordings of the data in the database comprises determining time spent by a worker associated with the radar tag at a plurality of work-related locations.

4. The method of claim 1, wherein evaluating the radar tag based on accessing the plurality of recordings of the data in the database comprises determining an inventory of a plurality of mobile devices associated with a plurality of radar tags.

5. The method of claim 1, further comprising activating a security camera in response to determining a change of location associated with the radar tag.

6. The method of claim 1, further comprising providing the data to a security camera in response to determining a change of location associated with the radar tag.

7. A system for radar tags, comprising:
    a radar tag;
    a mobile device comprising the radar tag;
    a server;
    a user interface;
    a transmitter configured to transmit a signal to the radar tag based on information associated with the mobile device, wherein the radar tag detects the signal and responds with a synthetic radar echo that includes radar tag information; and
    a receiver configured to receive the synthetic radar echo from the radar tag and to convey the synthetic radar echo to the server, wherein the server receives the synthetic radar echo, determines a location of the radar tag based on the synthetic radar echo, and provides data to the user interface to identify the radar tag and to specify the location of the radar tag.

8. The system of claim 7, wherein the transmitter is further configured to transmit the signal to the radar tag based on a location associated with at least one of a group consisting of an emergency communication, a base transceiver station associated with a recent communication by the mobile device, and a cell tower sector associated with a recent communication by the mobile device.

9. The system of claim 8, wherein the transmitter is further configured to transmit the signal to the radar tag based on a location of the emergency communication which specifies an identity associated with the radar tag.

10. The system of claim 7, wherein one or more of the transmitter is configured to transmit the signal as an encrypted data signal and the radar tag responds with the synthetic radar echo as an encrypted synthetic radar echo.

11. The system of claim 7, wherein the radar tag is configured to receive energy to respond with the synthetic radar echo from at least one of the transmitted signal and the mobile device.

12. The system of claim 7, wherein the mobile device is one of a group of mobile devices consisting of equipment, a mobile phone, a wireless handset, a portable computer, a tablet computer, an in-car computer, a mobile telecommunication device, a mobile handset, a personal digital assistant, a handheld gaming device, a handheld wireless mobile device, a pager, a digital camera, a digital music player, and a digital calculator.

13. The system of claim 7, wherein the transmitter and the receiver are combined in a transceiver.

14. The system of claim 7, wherein the transmitter is further configured to address the signal to a specified radar tag.

15. The system of claim 7, wherein the receiver is configured to receive synthetic radar echoes from a plurality of unspecified radar tags.

16. A method for radar tags, comprising:
   transmitting a signal to a plurality of radar tags that each creates a synthetic radar echo in response to receiving the signal;
   receiving a plurality of synthetic radar echoes from the plurality of radar tags;
   determining by a server computer a plurality of locations associated with the plurality of radar tags based on the plurality of synthetic radar echoes;
   recording by a server computer the plurality of locations associated with the plurality of radar tags and a plurality of times associated with determining the plurality of locations associated with the plurality of radar tags as data in a database;
   evaluating each of the plurality of radar tags based on accessing a plurality of recordings of the data in the database; and
   providing the evaluation of each of the plurality of radar tags to at least one service subscriber.

17. The computer implemented method of claim 16, wherein the evaluation comprises a traffic alert that indicates a traffic condition.

18. The computer implemented method of claim 16, wherein the evaluation comprises an estimated speed of a vehicle associated with one of the radar tags and the at least one service subscriber is a traffic enforcement agency.

19. The method of claim 16, wherein one of the plurality of synthetic radar echoes includes information provided by a corresponding one of the plurality of radar tags.

20. The method of claim 16, wherein the plurality of synthetic echoes each includes information from a corresponding one of the plurality of radar tags.

* * * * *